United States Patent [19]

Suzuki

[11] Patent Number: 5,432,782
[45] Date of Patent: Jul. 11, 1995

[54] PACKET SWITCHING SYSTEM

[75] Inventor: Muneyuki Suzuki, Inagi, Japan

[73] Assignee: Kabushiki Kaisha Toshiba, Kawasaki, Japan

[21] Appl. No.: 916,625

[22] Filed: Jul. 22, 1992

[30] Foreign Application Priority Data

Jul. 23, 1991 [JP] Japan .................................. 3-182648

[51] Int. Cl.⁶ ............................................ H04L 12/56
[52] U.S. Cl. .................................. 370/60; 370/85.11; 370/100.1; 370/67
[58] Field of Search ..................... 370/60, 60.1, 67, 94, 370/94.1, 58.1, 85.1, 100.1, 85.11; 340/825.07, 825.52

[56] References Cited

U.S. PATENT DOCUMENTS

| | | | |
|---|---|---|---|
| 4,581,733 | 4/1986 | Sarson et al. | 370/85.1 |
| 4,679,192 | 7/1987 | Vanbrabant | 370/85.1 |
| 4,862,451 | 8/1989 | Closs et al. | 370/85.1 |
| 5,062,106 | 10/1991 | Yamazaki et al. | 370/60 |
| 5,177,737 | 1/1993 | Daudelin et al. | 370/67 |

Primary Examiner—Hassan Kizou
Attorney, Agent, or Firm—Finnegan, Henderson, Farabow, Garrett & Dunner

[57] ABSTRACT

In a packet switching system, a plurality of transmitting/receiving interfaces are connected to a single data bus and a clock bus. A clock source supplies clock pulses marking a repeating series of data transmitting time slots to all of the interfaces over the clock bus, each time slot in the series being assigned to a different one of the interfaces. Each interface assembles packet data and an address received from a terminal or office line for transmission over the data bus during the interval of its assigned time slot and receives packet data from the data bus. Each interface extracts packet data addressed to it for transmission to another terminal or office line.

3 Claims, 13 Drawing Sheets

PACKET SWITCHING SYSTEM

BACKGROUND OF THE INVENTION

1. Field of the Invention

The present invention relates to a packet switching system for use in a packet communication system and more particularly to a packet switching system which uses a single duplex bus.

2. Description of the Related Art

A conventional packet switching system uses two buses, i.e., an upward bus and a downward bus to realize high-speed packet switching.

FIG. 8 schematically shows an arrangement of a cell switch in the conventional packet switching system. The cell switch of FIG. 8 includes a unidirectional or simplex transmission bus 630, a time slot allocator 640 for controlling the simplex bus 630 in a time-divisional manner, access controllers 602 for transmitting data in the form of a cell onto the simplex transmission bus 630 in accordance with an instruction of the time slot allocator 640, and address filters 603 for monitoring the destination data field of the cell on the simplex bus 630 and for selectively receiving the cells which are directed to its own output port 620.

Serial data inputted through an input port 610-1 is converted at a serial-parallel converter 601 into parallel data, which is subjected to a time-divisional control at the access controller 602, and then transmitted onto the bus 630. Of the cell data transmitted onto the bus 630, the address filter 603 selectively receives data directed to its own port 620-1. The received parallel data is converted into serial data at a parallel-serial converter 604 and then outputted to the output port 620-1. In this manner, data is converted and transmitted to a desired destination. In the same manner, data from one of input ports 610-1 to 610-$n$ is converted and transmitted to one of output ports 620-1 to 620-$m$.

FIG. 9 shows a conventional packet switching system in which two cell switches as shown in FIG. 8 are respectively used. When transmission is directed from one of terminal ports 801-1 to 801-7 to one of line ports 901-1 to 901-7, an upward bus 10 and an upward time-slot allocator 30 are used. For example, when the transmission is directed from the terminal port 801-1 to the line port 901-1, a cell switch, which comprises a serial-parallel converter 703, an access controller 704, an address filter 708, a buffer 709 and a parallel-serial converter 710, is operated. On the other hand, when the transmission is directed from one of the line ports 901-1 to 901-7 to one of the terminal ports 801-1 to 801-7, a downward bus 20 and a downward time-slot allocator 40 are used. For example, when the transmission is directed from the line port 901-1 to the terminal port 801-1, a cell switch, which comprises a serial-parallel converter 712, an access controller 711, an address filter 707, a buffer 706 and a parallel-serial converter 705, is operated.

Terminal interfaces 800-1 to 800-7 and line interfaces 900-1 to 900-7 are arranged on respective cards for each terminal port and each line port. In order to identify their own interfaces, addresses "0" to "D" are allocated to the interfaces (FIG. 13).

Referring to FIGS. 10 and 11, explanation will be made as to the flow of data in the upward direction, that is, from the terminal ports 801-1 to 801-7 to the line ports 901-1 to 907-7 in the cell switch of FIG. 9.

Referring to FIG. 10, when data is received from the terminal port 801 of a terminal interface 800, a cell assembler/disassembler 802 divides the received data into a plurality of 48-byte sub-data and attaches 5 bytes of a virtual communication path identifier (referred to as VCI, hereinafter) to each of the sub-data. Thus, cells each having 53 bytes are assembled. After assembling the cells, the cell assembler/disassembler 802 issues a cell transmission request to an access controller 805. The access controller 805, which has already received the address of its own terminal interface 800 from an address input line 813, receives the address of one of the terminal interfaces to which the transmission of the cell is permitted. When the address issued from the upward time slot allocator 30 coincides with the address of its own terminal interface 800, the access controller 805 issues a transmission approval signal to a serial-parallel converter 803. The serial-parallel converter 803, when receiving the transmission approval signal from the access controller 805, reads out the cell from a cell assembling/disassembling buffer (not shown) and converts the cell into parallel data. The cell outputted from the serial-parallel converter 803 is applied to a destination address (DA) attacher 804. The destination address attacher 804 extracts 2 bytes of a destination address (DA) from the identifier VCI of the cell, which is attached at the cell assembler/disassembler 802 and which is a path data indicating the address data of the line interface to be passed and the address of the terminal interface connected to another destination exchange, and attaches the destination address to the cell.

In the destination address attacher 804, there is provided a table showing correspondence between the VCIs and destination addresses (DAs) to be attached to the cell. The table corresponds the identifier VCI0 to the destination address DA0, . . . , VCIi to DAi, . . . , and VCIn to DAn. After the destination address is attached and thus the assembling of the 55-byte cell is completed, the terminal interface 800 transmits the cell onto the upward bus 10.

Referring to FIG. 11, explanation will be made as to subsequent upward flow of the cell data. Since all of the line interfaces are connected to the upward bus 10, a line interface 900 can receive all cells transmitted onto the upward bus 10. When the line interface 900 receives the cell from the bus 10, the destination address (DA) of the received cell is sent to an address filter 910 (more specifically, through an destination address (DA) reader 911 to a comparator 912, both provided in the address filter 910). The comparator 912 compares the destination address (DA) of the received cell with its own address already received from an address input line 913. When the destination address of a cell coincides with its own address, the comparator 912 sends the cell to a buffer 908. A destination address (DA) header deleter 909 removes the destination address (DA) from the cell thus received and stores it in the buffer 908. Thereafter, the cell read out from the buffer 908 is converted at a parallel-serial converter 907 into serial data and then output to a line port 901 through a line input/output interface 902.

Explanation will next be made on the downward transmission, i. e., from the line ports to the terminal ports. Referring to FIG. 11, when receiving data corresponding to one cell from the line 901, the line input/output interface 902 issues to an access controller 905 a cell transmission request to the downward bus 20. To the access controller 905, the address of the line interface is also applied to which data transmission is permitted from the downward time slot controller 40. The address of its own line interface 900 has already been received from the address input line 913. A comparator 906 of an access controller 905 compares the address issued from the downward time slot controller 40 with the address of its own line interface 900. When the both addresses coincide, the comparator 905 issues a transmission approval signal to the serial-parallel converter 903. The serial-parallel converter 903, when receiving the transmission approval signal, reads out the cell from a line interface buffer (not shown) and converts it into parallel data. The converted cell data is sent from the serial-parallel converter 903 to a destination address (DA) attacher 904. The destination address attacher 904 refers to the cell identifier (VCI) attached to the received cell and attaches the address of the terminal interface to which the cell is to be transmitted, i.e., the destination address DAi (2 bytes) to the cell. After attaching the destination address DAi to the cell so as to complete the assembling of a 55-byte cell at the destination address attacher 904, the line interface 900 transmits the cell to the downward bus 20.

Referring back to FIG. 10, the explanation of subsequent downward flow of the cell data will be made. The downward bus 20 is connected to all the terminal interfaces so that the terminal interface 800 can receive all cells transmitted onto the downward bus 20. Accordingly, when the terminal interface 800 receives the cell from the bus 20, the destination address (DA) of the received cell is sent to an address filter 810 (more specifically, through an destination address (DA) reader 811 to a comparator 812, both provided in the address filter 810). The comparator 812 compares the destination address (DA) of the received cell with its own address already received from an address input line 813. When these addresses coincide with each other, the comparator 812 sends the cell to a buffer 808. A destination address (DA) header deleter 809 removes the destination address (DA) from the cell thus received and stores it in the buffer 808. Thereafter, the cell read out from the buffer 808 is converted at a parallel-serial converter 807 into serial data, converted at the cell assembler/disassembler 802 into data of terminal format, and then output to the terminal port 801.

The switching/transmission of cells between the terminals and lines has been explained above. Referring back to FIG. 9, in actual applications, there are other cell switching/transmission methods such as extension communication in which a cell received from one terminal port is transferred to another terminal port, e.g., from the terminal port 801-1 to the terminal port 801-2, switching relay in which a cell received from one line port is transferred to another line port, e.g., from the line port 901-1 to the line port 901-2, and loopback in which a received cell from a terminal or line port is transferred back to itself.

With the exchange having the conventional cell switches, the loopback communication is realized by using a line- or terminal-side loopback unit 1000 or 1100 (FIG. 9).

Explanation will be made below as to the switching/transmission with use of the line- and terminal-side loopback units 1000 and 1100. First, the switching relay using the line-side cell loopback unit 1000 and the line-side loopback operation will be explained by referring to FIG. 12. The illustrated line-side cell loopback unit 1000 receives a cell from the downward bus 20, attaches, at a destination address attacher 1004, a destination address (DA) to the received cell, and then transmits the address-attached cell onto the upward bus 10 from the destination address attacher 1004. In other words, the line-side cell loopback unit 1000 has a function of switching to the upward bus 10 in such a manner that a cell transmitted from a line interface can be received again by the same line interface. Accordingly, switching relay between lines i and j is realized in the following manner. First, the destination address attacher of the line interface i connected to the line i is previously arranged so that a destination address (DA) is set to be "E" with respect to an identifier (VCIj), whereby a cell designated by the identifier (VCIj) indicative of switching relay to the line j is transferred to the line-side cell loopback unit 1000, wherein the symbol "E" denotes the address of the line-side cell loopback unit 1000. Similarly, the line-side cell loopback unit 1000 is previously set so that a destination address (DAj) to be transferred to the line interface j connected to the line j is given with respect to the identifier (VCIj).

When the destination address attacher is set in such a manner as described above, the cell received from the line i is switched and relayed to the line j. On the other hand, when a cell received from the line j is switching-relayed to the line i, the line interface j is previously designed so as to set the destination address DA to be "E" for an identifier (VCIi), while the line-side cell loopback unit 1000 is designed so as to set an destination address (DAi) for the identifier (VCIi).

The line-side loopback can be similarly realized by setting a table in the destination address attacher. For example, when the loopback is carried out with respect to the line i, the line interface i is designed so as to set the destination address (DA) to be "E" for an identifier (VCIib), while the line-side cell loopback unit 1000 is designed so as to set the destination address (DAi) for the identifier (VCIib).

Now, the switching relay and the line-side loopback operation have been explained in connection with the use of the line-side cell loopback unit as an example. Similarly, the extension communication and the terminal-side loopback can be carried out with use of the terminal-side cell loopback unit.

FIG. 13 is a schematic view of a conventional packet switching system. As shown in FIG. 13, the packet switching system comprises two upward and downward cell switches. In the back plane, there are provided a total of 44 lines, that is, two sets of 4 address bus lines, two sets of 2 clock signal lines, and two sets of 16 data bus lines. Further, two cards of terminal- and line-side loopback units for extension communication, switching relay or loopback are mounted.

Since the conventional system comprises the 2 upward and downward cell switches, the two sets of address buses, clock signals and data buses must be provided in the back plane of the cell switches. In addition, for the purpose of realizing such communication as the extension communication, switching relay or loopback, the system requires dedicated cards (hardware). As a result, the conventional system has had such a problem that the system has become complicated and requires large-scale hardware.

SUMMARY OF THE INVENTION

It is an object of the present invention to provide a packet switching system which can eliminate the above problem in the conventional system and which can realize such communication as extension communication, switching relay and loopback with a small number of lines provided on the back plane of the packet switching system with no need of a special hardware.

To achieve the object, the packet switching system of the present invention comprises a single common duplex bus; clock supplying means for supplying a plurality of different clocks including information indicative of state of a time slot; a plurality of terminal interfaces each for attaching an address to a packet received from a terminal to prepare a switching packet and for controlling transmission of the packet to the common duplex bus on the basis of the plurality of different clocks received from the clock supplying means so as to prepare a packet for the terminal from the switching packet received from the common duplex bus and having address of its own; and a plurality of line interfaces each for attaching an address to a packet received from a terminal to prepare a switching packet and for controlling transmission of the packet to the common duplex bus on the basis of the plurality of different clocks received from the clock supplying means so as to prepare a packet for the terminal from the switching packet received from the common duplex bus and having address of its own.

With the construction described above, since a duplex data bus is used for a cell switch, the number of required lines provided on the back plane of the packet switching system is reduced to half and since all cells are transmitted onto the single duplex bus, all interface cards including its own interface card can receive the cells and the need for the provision of special hardware can be eliminated to realize such communication as extension communication, switching relay and loopback.

Further, since time-divisional control over the bus is provided as dispersed into the respective interface cards and a transmission time slot is recognized by counting cell transmission timing, the number of required control signal lines provided on the back plane of the system can be reduced compared with the conventional system in which an address is assigned to each card.

DESCRIPTION OF THE PREFERRED EMBODIMENTS

Embodiments of the present invention will be detailed with reference to the accompanying drawings.

Figure 1:
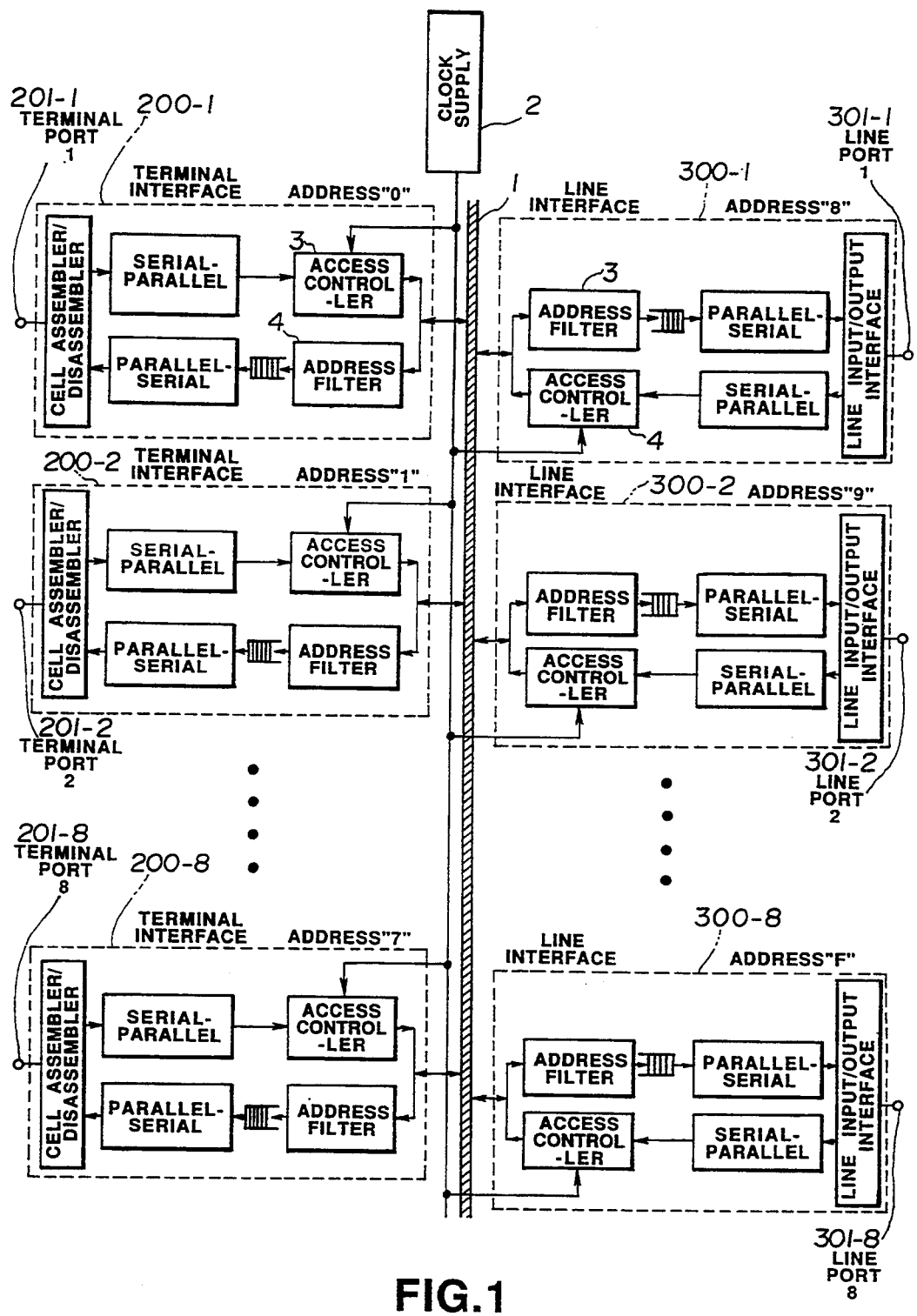
FIG. 1 is a block diagram illustrating a packet switching system in accordance with an embodiment of the present invention.

Referring first to FIG. 1, a cell switch comprises a common bi-directional or duplex bus 1 commonly used for upward switching/transmission from terminal ports 201-1 to 201-8 to line ports 301-1 to 301-8 and for downward switching/transmission from the line ports 301-1 to 301-8 to the terminal ports 201-1 to 201-8, a clock supply unit 2 for supplying a cell transmit/receive timing signal to respective interface cards 200-1 to 200-8 and 300-1 to 300-8 so as to control the common bus 1 on a time divisional basis, access controllers 3 provided in the respective interface cards for counting the cell transmission timing clock so as to control the cell transmission timing, and address filters 4 for monitoring the destination data fields of the cells transmitted onto the common bus 1 and for selectively receiving the cells directed to their own ports. The terminal interfaces 200-1 to 200-8, which comprise a total of 8 cards, are identified themselves by address numbers of 0 to 7. Similarly, the line interfaces 300-1 to 300-8, which comprise a total of 8 cards, are identified themselves by address numbers of 8 to F.

Figure 2:
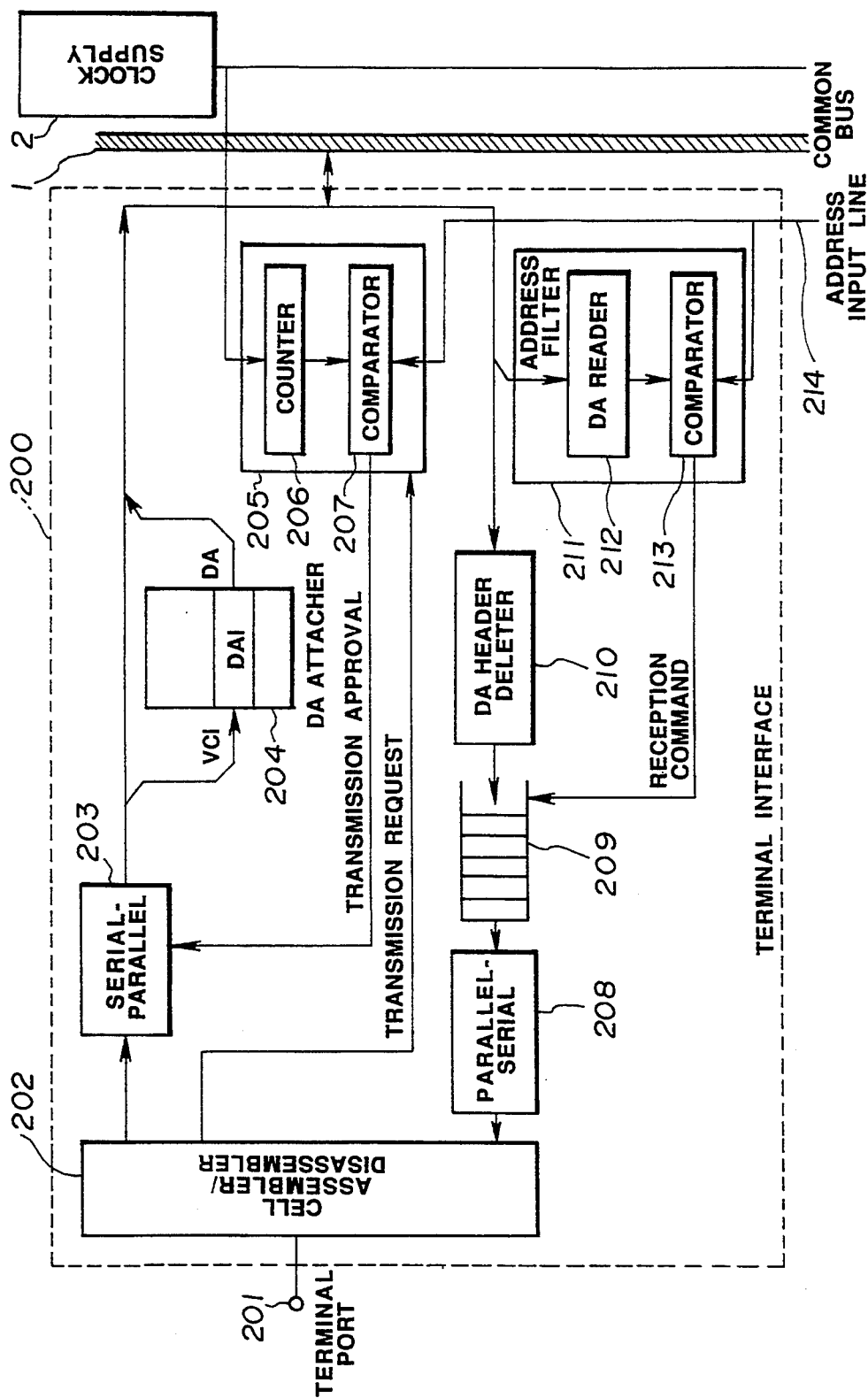
FIG. 2 is a block diagram illustrating one of terminal interfaces in the packet switching system of FIG. 1.
Figure 3:
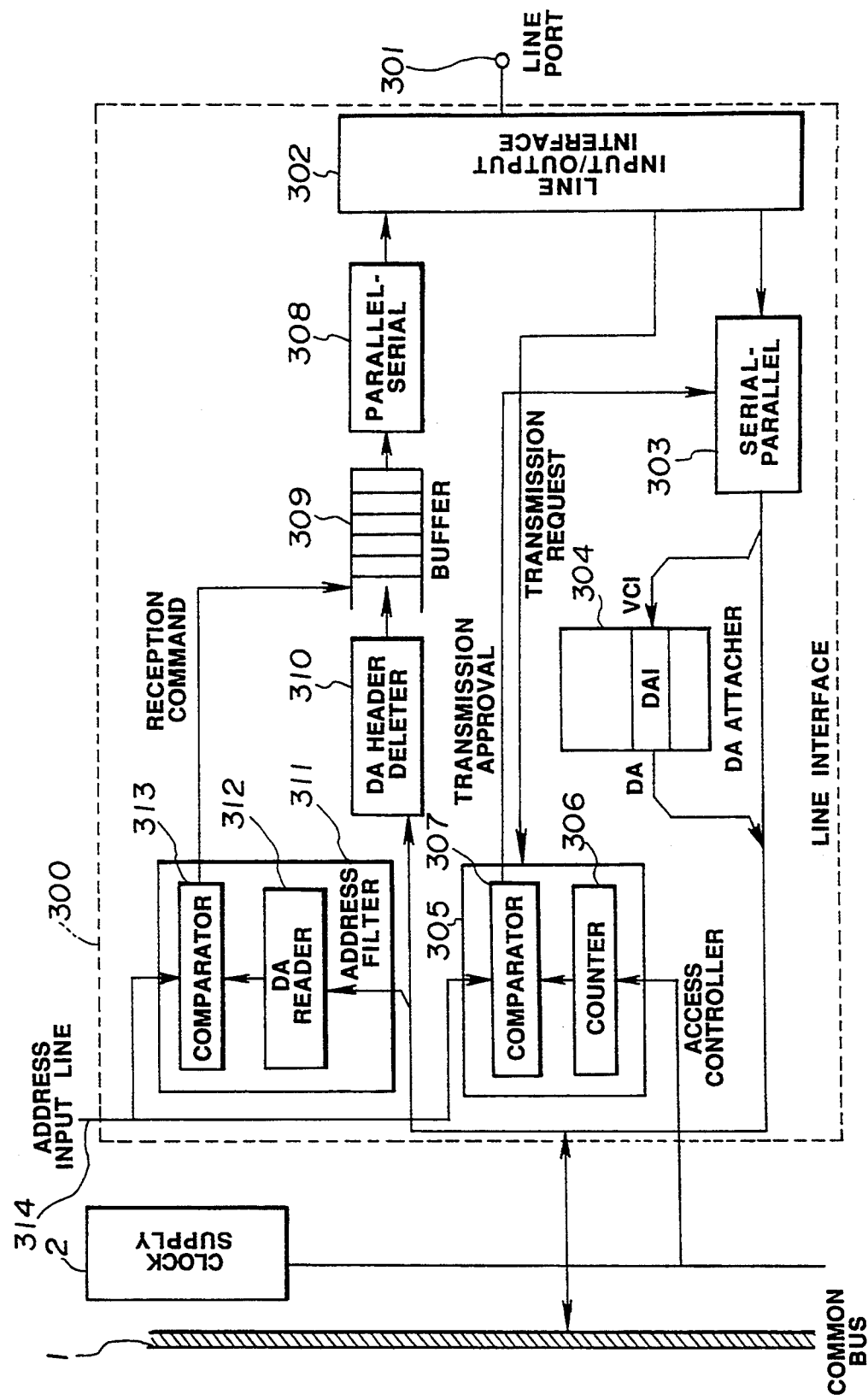
FIG. 3 is a block diagram illustrating one of line interfaces in the packet switching system of FIG. 1.
Figure 4:
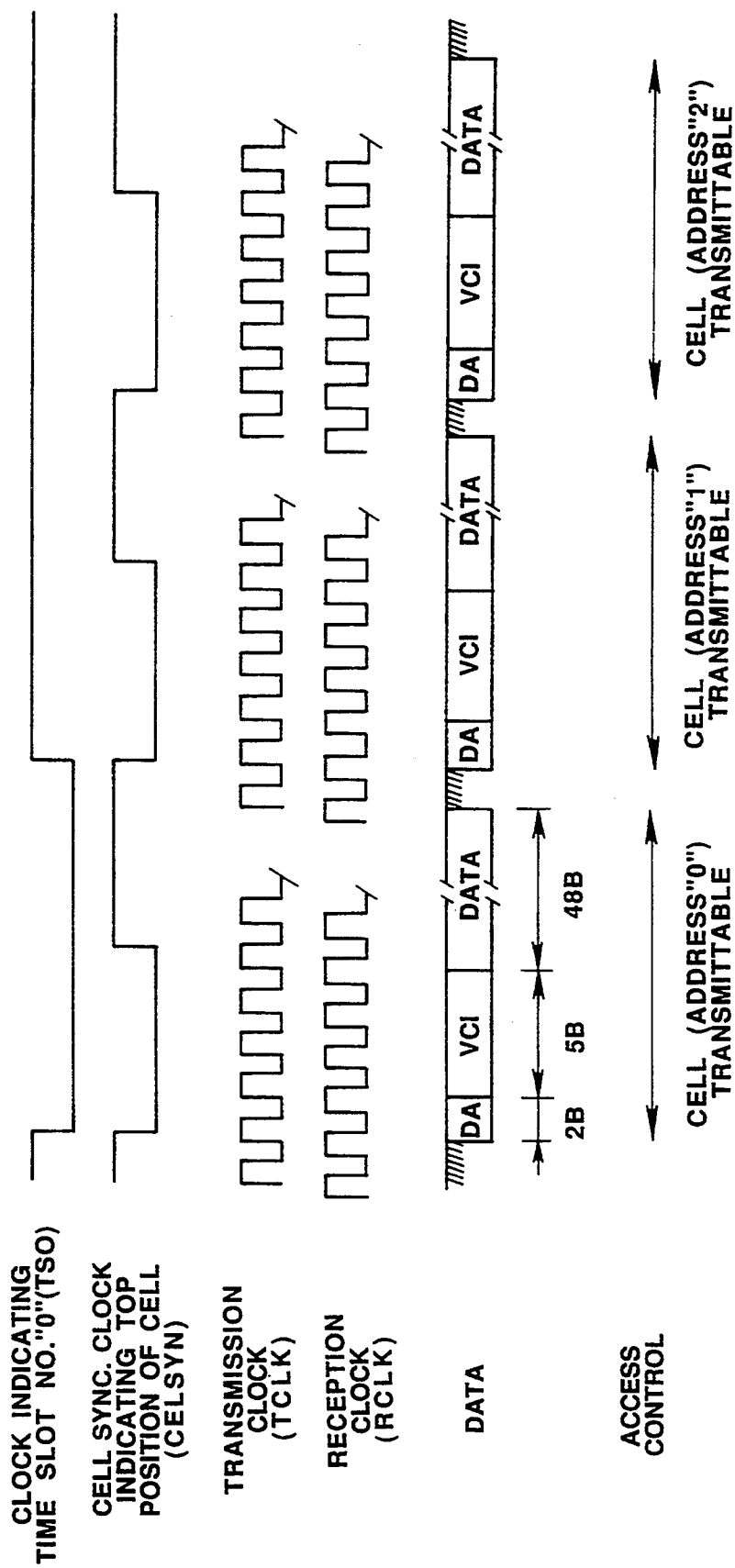
FIG. 4 is a timing chart for illustrating the timing of a cell switch.

Referring to FIGS. 2, 3 and 4, explanation will be made as to a cell flow from the terminal ports 201-1 to 201-8 to the line ports 301-1 to 301-8.

Referring to FIG. 2, when data is received through the terminal port 201, a cell assembler/disassembler 202 of the terminal interface 200 divides the received data into a plurality of 48-byte sub-data and attaches 5 bytes of identifier indicative of a virtual communication path (hereinafter referred to as the VCI) to each of the sub-data so as to assemble cells each having 53 bytes. After assembling the cells, the cell assembler/disassembler 202 issues a cell transmission request to an access controller 205.

The explanation of the cell transmission control of the access controller 205 will be made by referring to FIG. 4 The access controller 205 has a counter 206 which is operated by a clock TSO indicative of a time slot number "0" and a cell synchronizing clock CELSYS indicative of the top position of the cell, both clocks being outputted from the clock supply unit 2. When the clock TSO indicative of the time slot number "0" becomes a low (L) level, the count value of the counter 206 is reset to "0". After that, each time the counter 206 receives a falling edge of the cell synchronizing clock CELSYS, the counter 206 counts up its count value. In this manner, the access controller 205 can be informed of the time slot of the common bus 1 under the time divisional control from the count value of the counter 206.

When the access controller 205 receives the cell transmission request from the cell assembler/disassembler 202, a comparator 207 provided in the access controller 205 compares the count value received from the counter 206 with the its own address which had been received from an address input line 214. When the count value of the counter 206 coincides with its own address, the comparator 207 sends a transmission approval signal to a serial-parallel converter 203.

The serial-parallel converter 203, when receiving the transmission approval signal from the access controller 205, reads out the assembled cell from a cell assembler/-disassembler buffer (not shown) and converts the read-out cell into a parallel data. The parallel-data cell outputted from the serial-parallel converter 203 is applied to a destination address attacher 204 where, on the basis of the identifier VCI attached at the cell assembler/-disassembler 202, the address of a line interface i connected to a line through which the cell is to be transmitted, that is, destination address DAi of two bytes is attached to the cell.

The destination address attacher 204 has a correlation table showing correspondence between the identifiers VCI and the destination addresses DA to be attached to the associated cells by referring to the identifiers VCI. In other words, the table shows relations Of a destination address DA0 for an identifier VCI0, a destination address DAi for an identifier VCIi, . . . , and a destination address DAn for an identifier VCIn.

When completing the assembling of the 55-byte cell, the terminal interface 200 transmits the cell onto the common bus 1.

Now, the flow of the cell will be explained by referring to a structure of one line interface of FIG. 3. Since the common bus 1 is a single bus and, as its name indicates, is connected to all the line interfaces and terminal interfaces, the interfaces connected to the common bus 1 can receive all the cells transmitted to the common bus. Accordingly, when the line interface 300 receives the cell from the common bus 1, the received cell is applied through a destination address reader 312 to a comparator 313, both being provided in an address filter 311. The comparator 313 compares the destination address DA of the received cell with its own address already received from an address input line 314. When they coincide with each other, the cell is selected and reception instruction is sent to a buffer 309. The cell thus received is subjected at a destination address header deleter 310 to a deletion of its destination address DA and then stored in the buffer 309. Thereafter, the cell read out from the buffer 309 is converted at a parallel-serial converter 308 into serial data which is outputted to a line port 301 through a line input/output interface 302.

The switching/transmission of the cell from the terminal ports to the line ports has been explained.

Explanation will next be made as to the switching/-transmission of cells from the line ports to the terminal ports. In FIG. 3, when the line input/output interface 302 of the line interface 300 receives data corresponding to one cell from the line port 301, the line input/output interface 302 issues a cell transmission request to an access controller 305. When the access controller 305 receives the cell transmission request from the line input/output interface 302, a comparator 307 of the access controller 305 compares a count value of a counter 306 of the access controller 305 received from the clock supply unit 2 with its own address, in the same manner as the corresponding access controller in the terminal interface 200. When they coincide with each other, the comparator 307 issues a transmission approval signal to a serial-parallel converter 303. An output cell of the serial-parallel converter 303 is applied to a destination address attacher 304 which in turn refers to the identifier VCI attached to the received cell and attaches to the cell the address of the terminal interface i connected to its target terminal, i.e., the destination address DAi (2 bytes).

When the assembling of the 55-byte cell is completed, the line interface 300 transmits the cell onto the common bus 1.

Now, the cell flow will be explained by referring to the detailed block diagram of the structure of one terminal interface of FIG. 2. Since the common bus 1 is connected to all the line interfaces and terminal interfaces, the interfaces connected to the common bus 1 can receive all the cells transmitted onto the common bus. Accordingly, when the terminal interface 200 receives the cell from the common bus 1, the received cell is applied through a destination address reader 212 to a comparator 213, both being provided in an address filter 211. The comparator 213 compares the destination address DA of the received cell with its own address already received from the address input line 214 and only when finding a coincidence therebetween, sends the received cell to a buffer 209. The cell thus received is subjected at a destination address header deleter 210 to a deletion of its destination address DA and then stored in the buffer 209.

Thereafter, the cell read out from the buffer 209 is converted at a parallel-serial converter 208 into serial data and converted at the cell assembler/disassembler 202 into terminal type data that is then output to the terminal port 201.

Explanation will then be directed to the extension communication, loopback and switching relay of the present invention based on the cell switch.

Since the conventional cell switch has a structure in which upward and downward buses are separately provided, there have been restrictions that the cell transmitted to the terminal interface side can be received only at the line interface side, while the cell transmitted to the line interface side can be received only at the terminal interface side. For this reason, the extension communication, loopback and switching relay require a special hardware.

However, since the cell switch of the present invention employs a common upward and downward bus as mentioned above, the cell transmitted onto the common bus can be received at all the interfaces (including its own interface) connected thereto. Accordingly, in the case of the extension communication, the destination address DAj of the terminal interface j is set with respect to the identifier VCIi so that the cell having an identifier VCIj indicative of the extension communication with the terminal interface j is transferred to the terminal interface j.

The switching relay between lines i and j can be realized in substantially the same manner. That is, the destination address DAj of the line interface j is set with respect to the identifier VCIj so that the cell having an identifier VCIj indicative of the switching relay with the line j is transferred to the line interface j. Similarly, the loopback can be realized by providing its own address as the destination address DA with respect to an identifier VCIlb indicative of the loopback.

In this way, with the cell switch of the present invention, since a single common bus is employed in place of separated upward and downward buses, this eliminates the need for a special hardware for the extension communication, loopback and switching relay and only requires a desired transfer destination address to be written into the destination address DA of the cell header.

According to the present embodiment, at the time of transmitting the cell onto the common bus, the current address is recognized on the basis of the count value of a counter in the access controller dispersely provided in the interfaces based on the clock of the clock supply unit 2. Therefore, it becomes unnecessary to provide lines for address control by a time slot allocation as in the conventional system.

Figure 5:
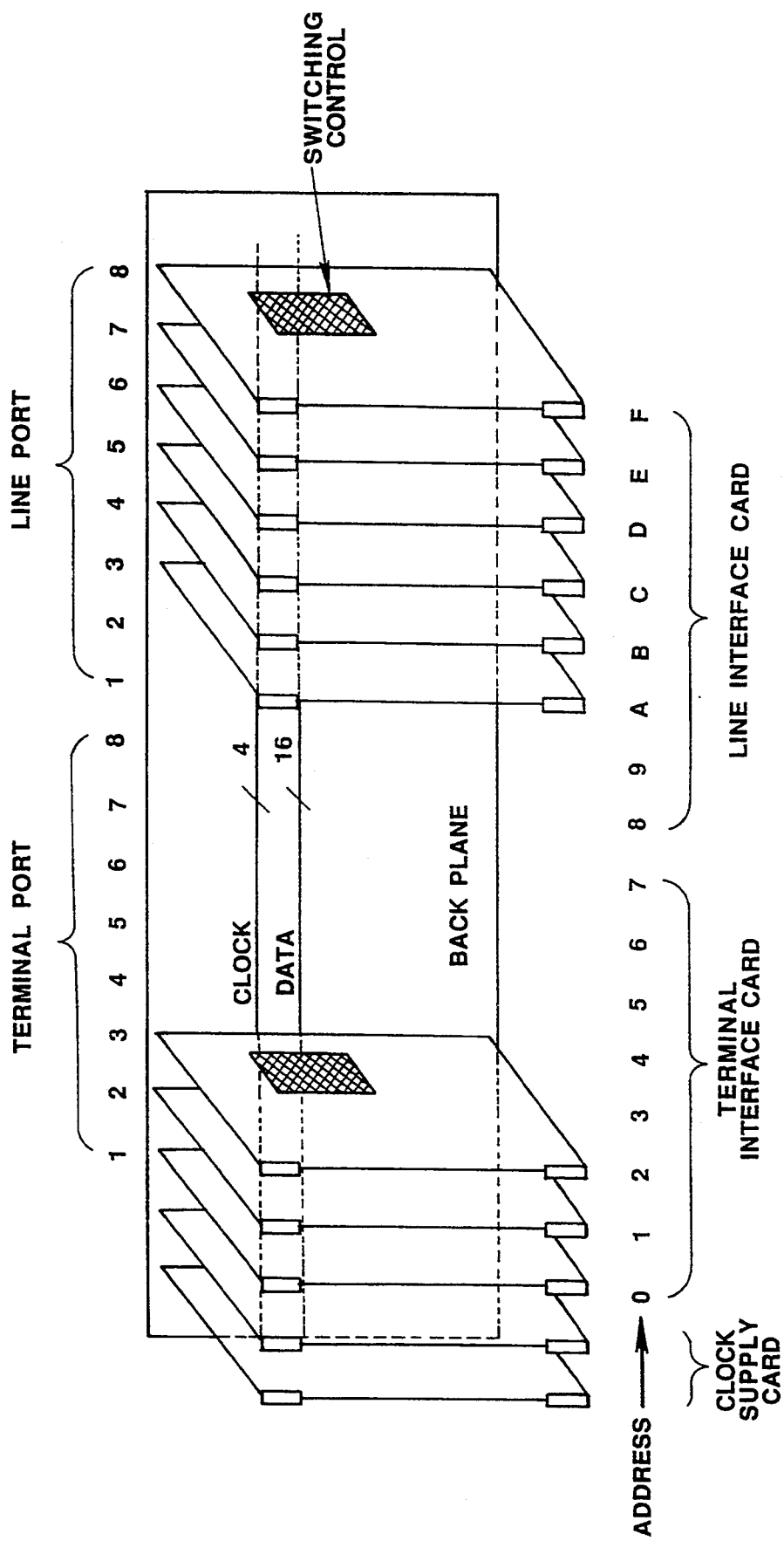
FIG. 5 schematically illustrates the packet switching system using the cell switch according to the present invention.

FIG. 5 schematically shows a packet switching system using a cell switch of the present invention as described above. As described above, in the packet switching system of the present invention, only 4 clock lines and 16 data lines are provided on the back plane of the system. Thus, the number of lines in the present invention can be reduced to below half of that of the conventional cell switch. Further, since the present invention does not require a special hardware for the extension communication, loopback and switching relay, a total of two more line and terminal interface cards can be additionally provided.

Next, explanation will be made as to another embodiment in which such time divisional control is not carried out over the terminal and line interfaces diversely disposed as in the packet switching system of FIG. 1. Instead, upward and downward time divisional control is systematically carried out under control of a single time slot allocator.

Figure 6:
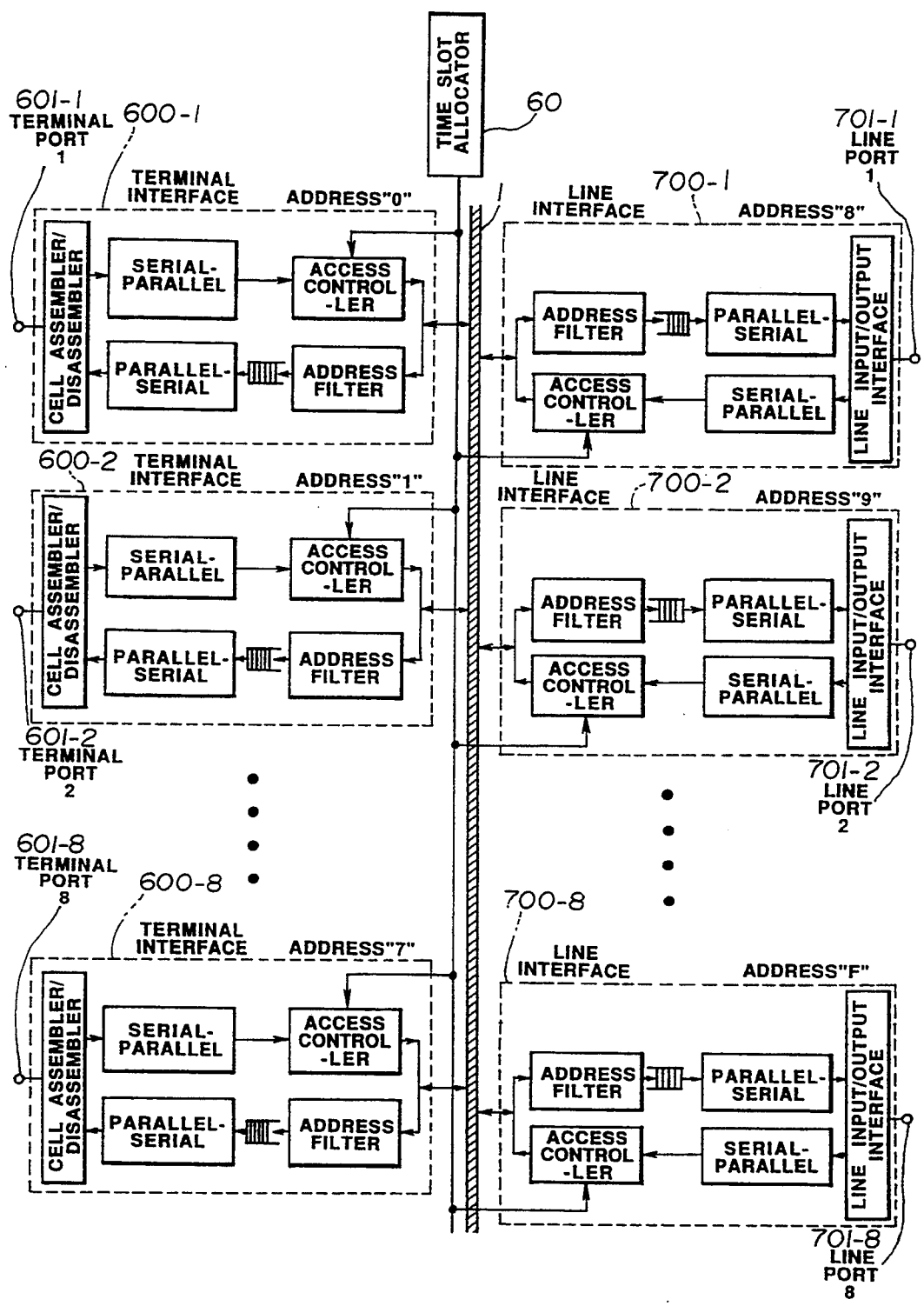
FIG. 6 is a block diagram illustrating a packet switching system in accordance with another embodiment of the present invention.

FIG. 6 is a block diagram of an arrangement of a packet switching system in accordance with another embodiment of the present invention. The illustrated packet switching system of FIG. 6 includes a common bus 1 which is the same as in FIG. 1, terminal interfaces 600-1 to 600-8, line interfaces 700-1 to 700-8, and a time slot allocator 60 for sending to the respective interfaces transmitting and receiving clocks and address control signals for approval of packet transmission inherent to the respective interfaces so as to perform time slot allocation. In this embodiment, addresses "0" to "7" are provided for the terminal interfaces 600-1 to 600-8, while addresses "8" to "F" are provided for the line interfaces 700-1 to 700-8, respectively.

Figure 9:
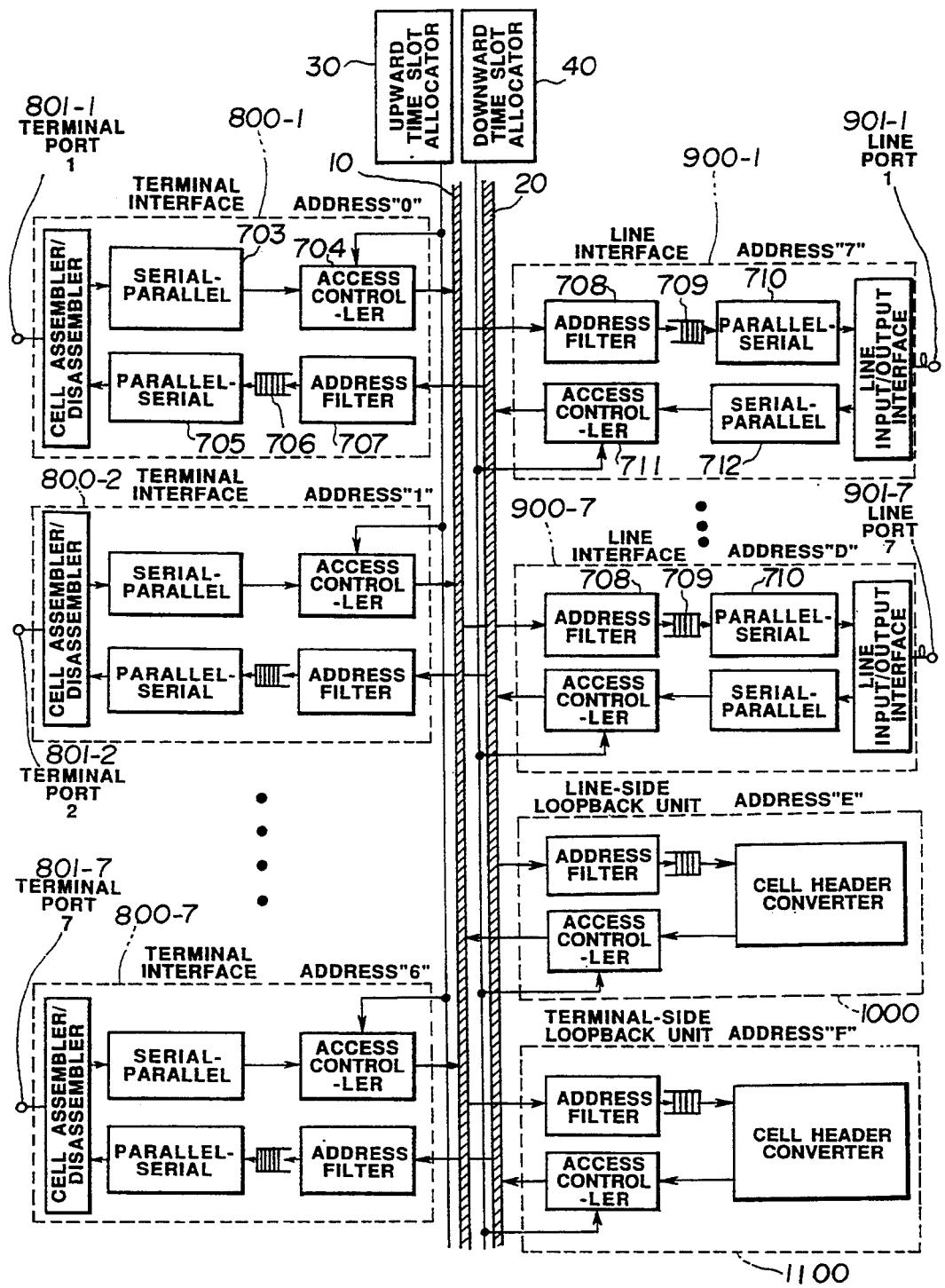
FIG. 9 is a block diagram illustrating of a packet switching system using conventional cell switches.
Figure 10:
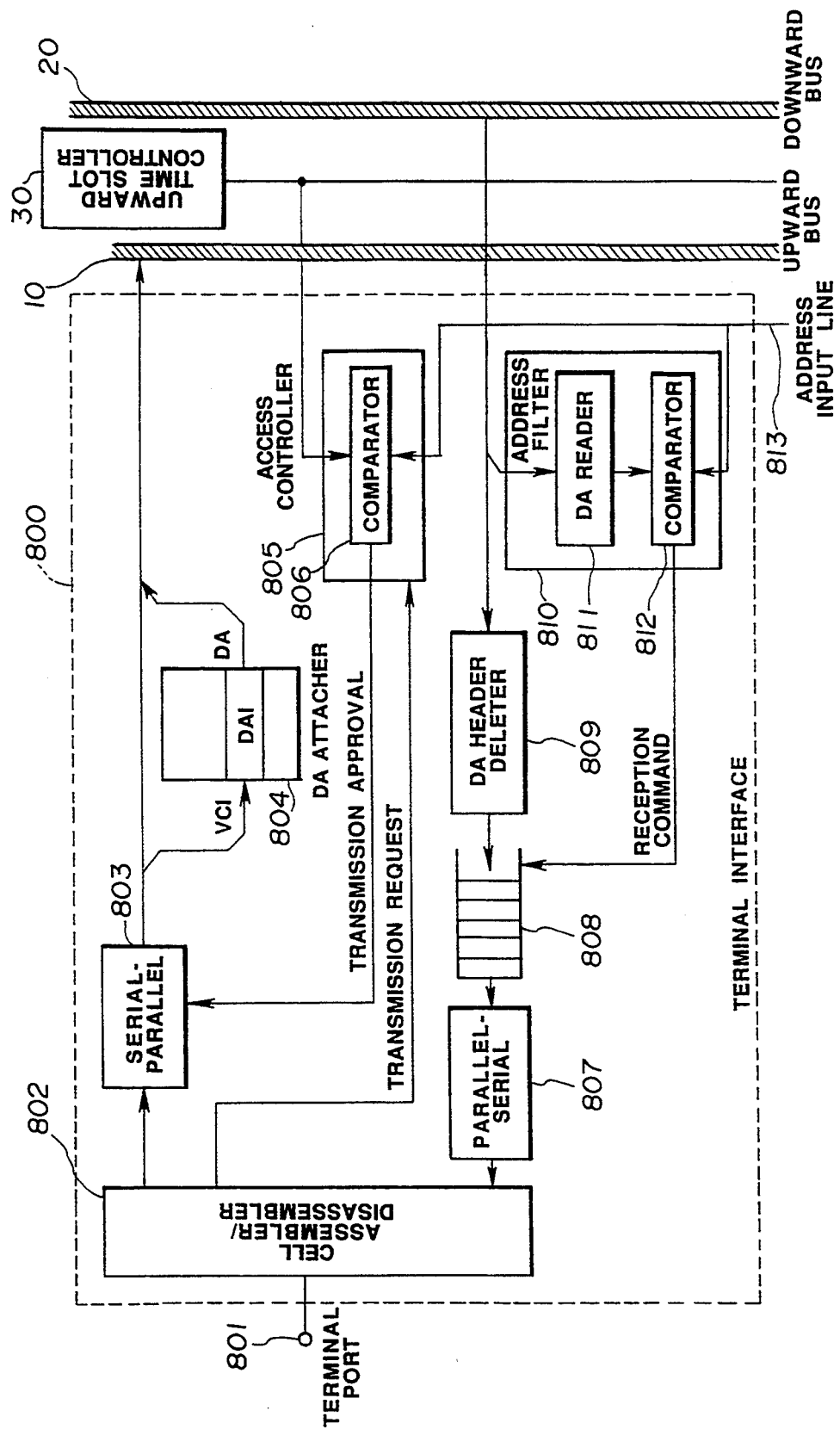
FIG. 10 is a block diagram illustrating one of terminal interfaces in the conventional system.
Figure 11:
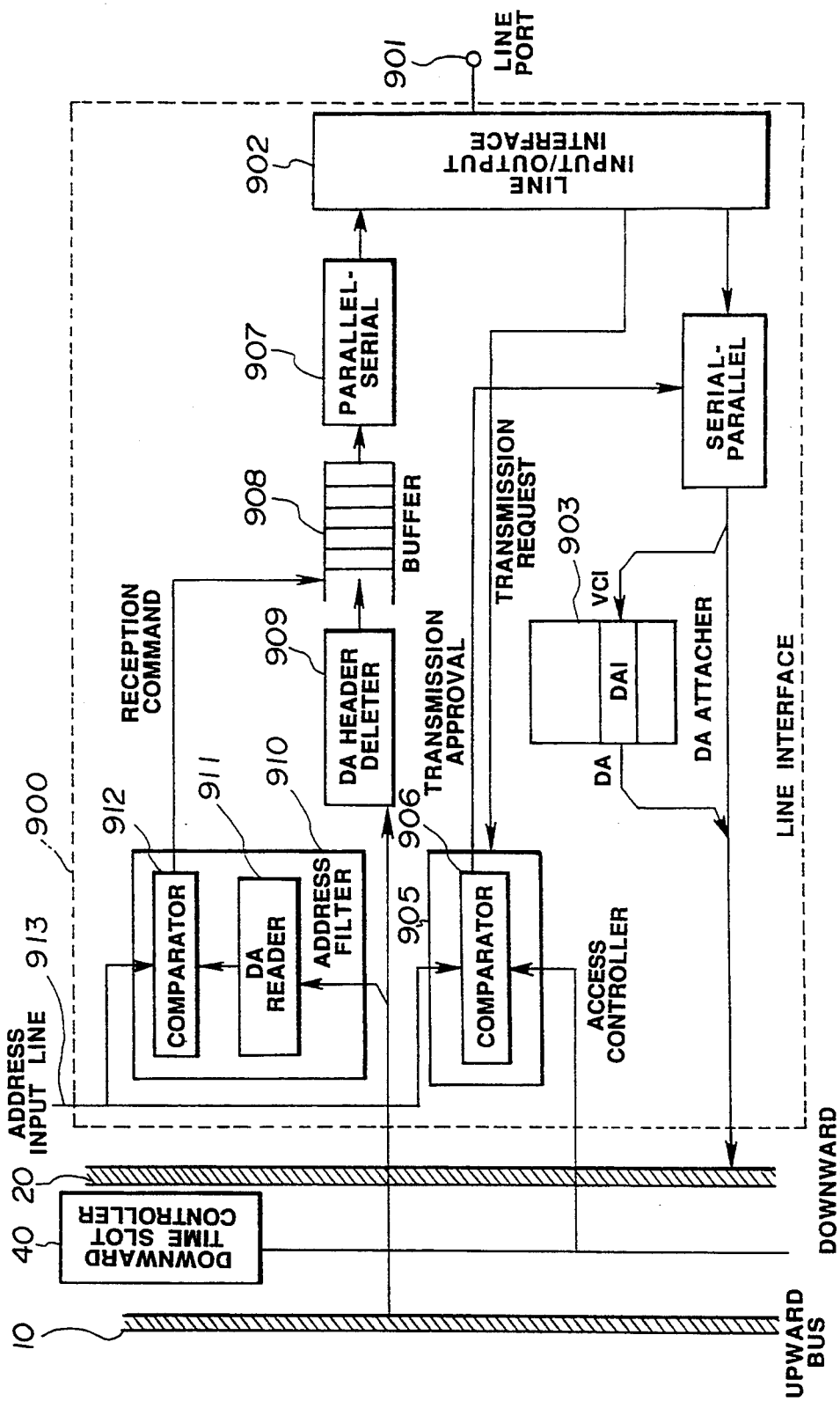
FIG. 11 is a block diagram illustrating one of line interfaces in the conventional system.
Figure 12:
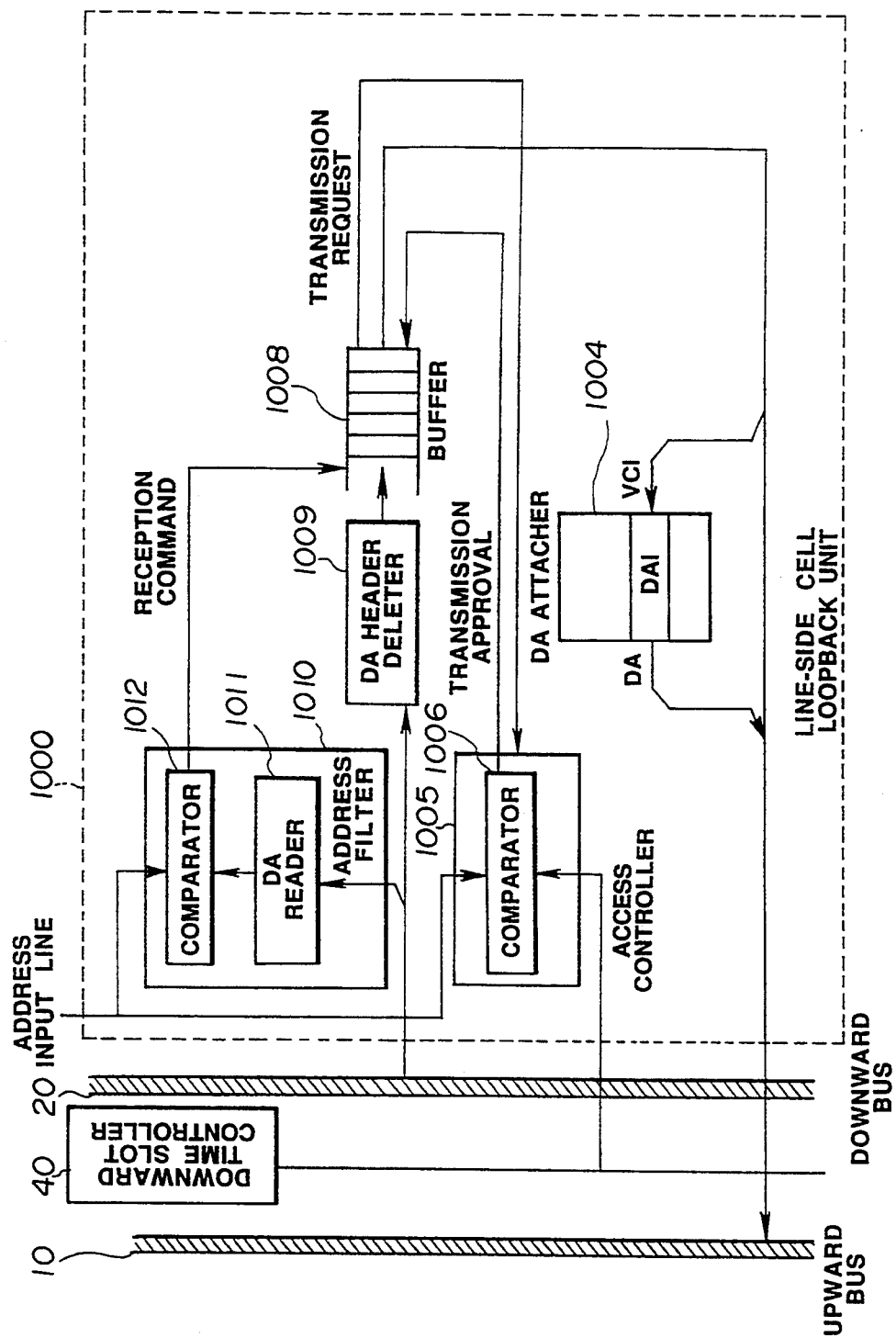
FIG. 12 is a block diagram illustrating a line-side cell loopback unit in the conventional system.
Figure 13:
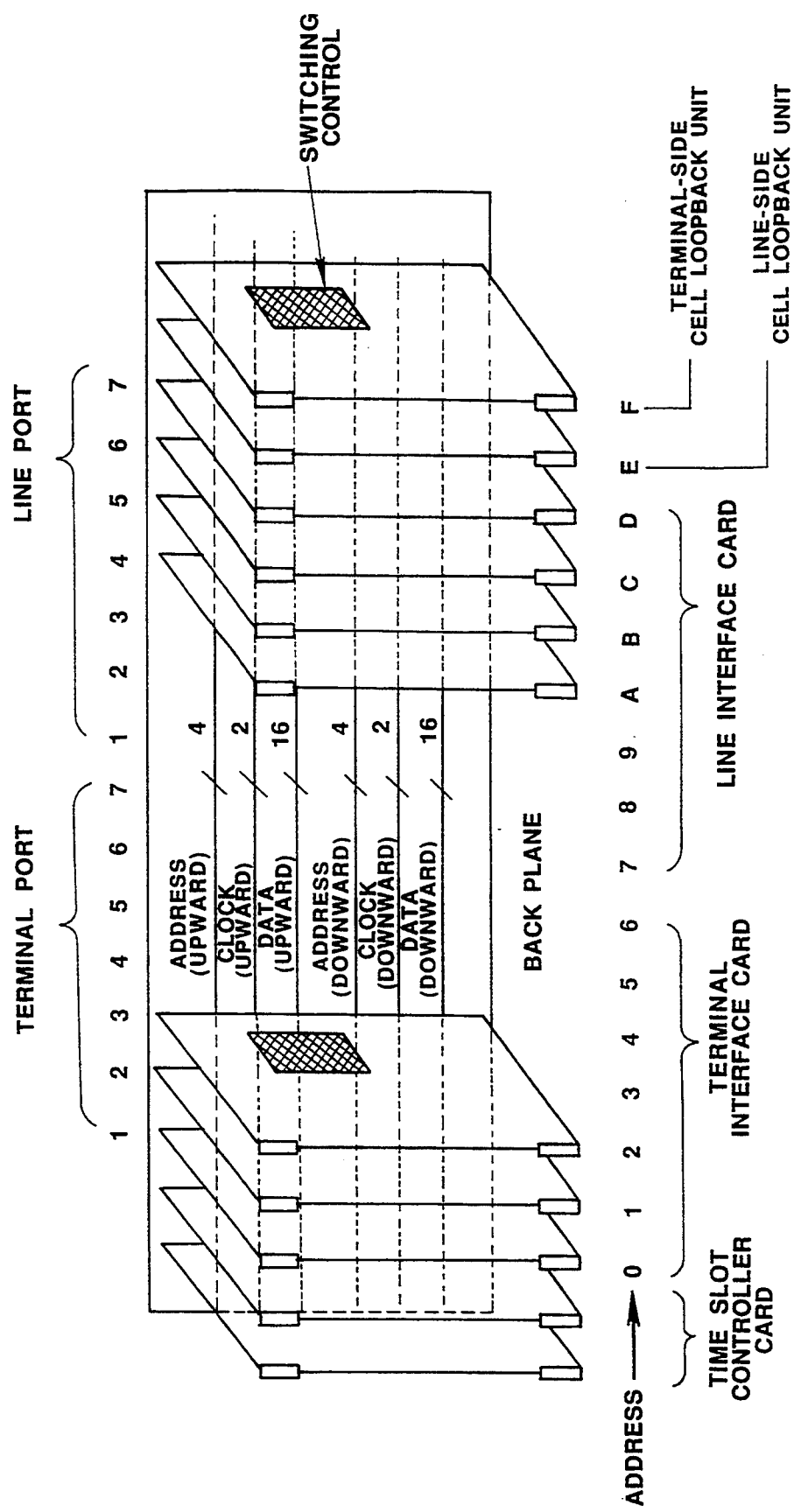
FIG. 13 schematically illustrates a packet switching system using conventional cell switch.

The structure of the terminal interfaces 600-1 to 600-8 is substantially the same as that of the terminal interfaces 600-1 to 600-7 in FIG. 9. The structure of the line interfaces 700-1 to 700-8 is substantially the same as that of the line interfaces 900-1 to 900-7 in FIG. 9.

Unlike the packet switching system of FIG. 1, the time slot allocator 60 of this packet switching system performs integrated time divisional control to realize switching connection. Therefore, the time slot allocator 60 directly designates the address of the access controller of desired one of the interfaces 600-1 to 600-8 and 700-1 to 700-8 connected to the single common bus 1 to carry out time divisional control of switching connection. The time slot allocator 60, which has a combined function of the upward and downward time slot allocators 30 and 40 in FIG. 9, sends the transmit clock for packet transmission, the receive clock for packet reception and the address control signals to the respective interfaces so as to perform time slot allocation.

With the structure described above, the loopback connection switching, which is carried out by the line- and terminal-side loopback units 1000 and 1100 in the conventional system of FIG. 9, is performed by means of address designation of the interfaces 600-1 to 600-8 and 700-1 to 700-8. Accordingly, the system of this embodiment does not require such loopback units as in the conventional system.

Figure 7:
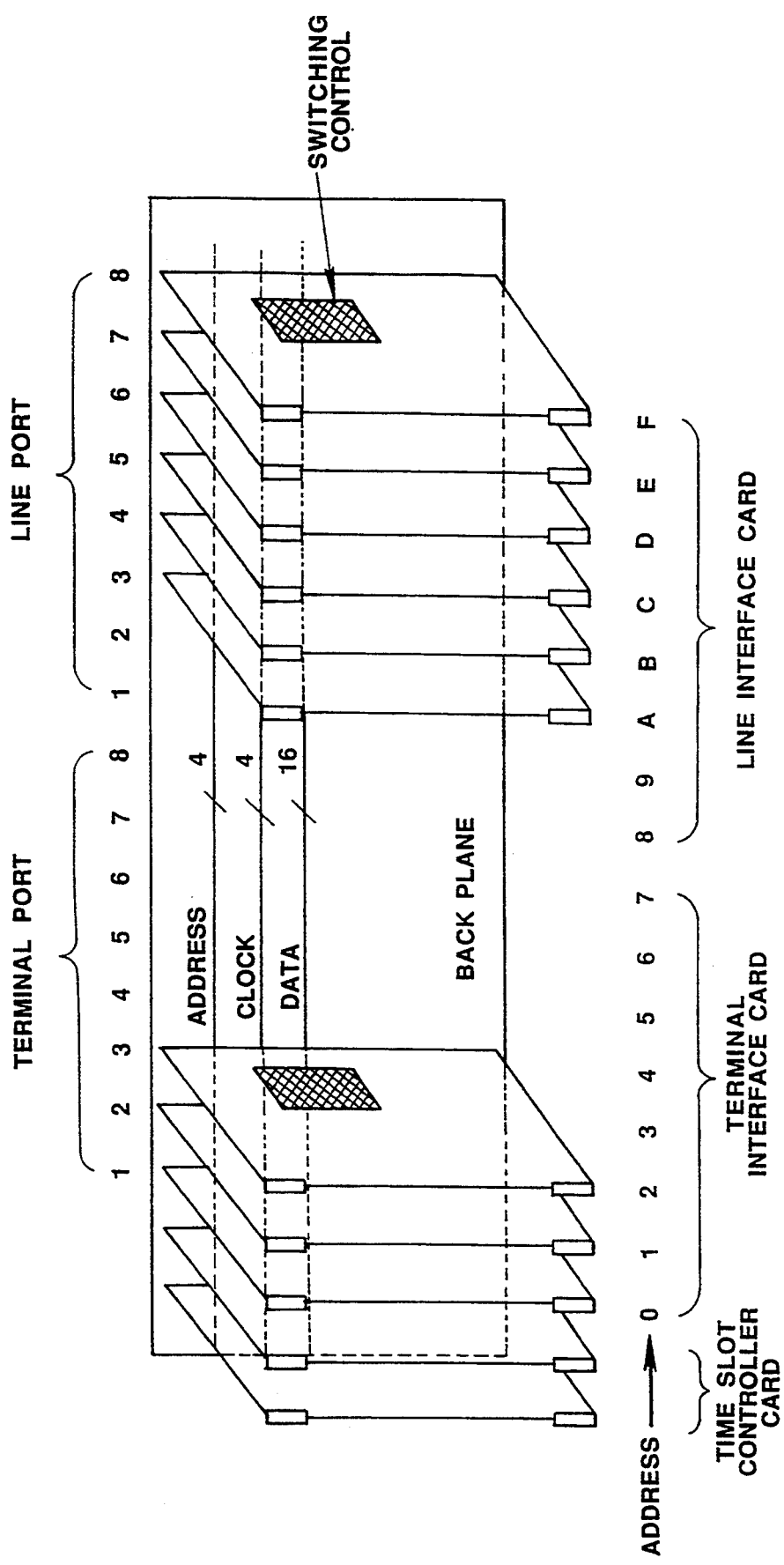
FIG. 7 schematically illustrates the packet switching system of FIG. 6.
Figure 8:
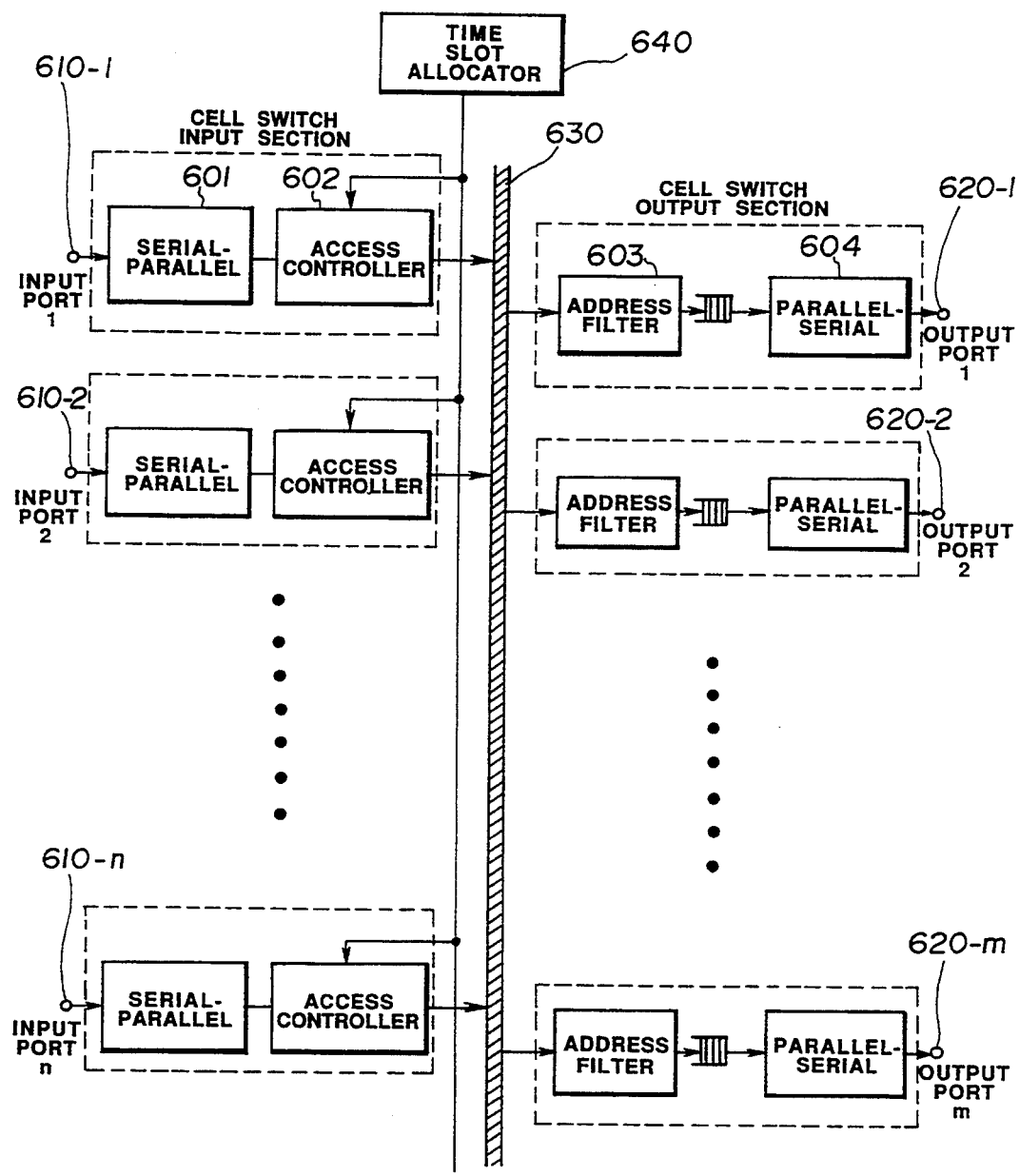
FIG. 8 is a block diagram illustrating cell switches in a conventional packet switching system.

FIG. 7 is a schematic view of the packet switching system of FIG. 6, in which 4 address control signal lines, 4 clock signal lines for transmission and reception and 16 data lines are provided on the back plane of the system. Since the line- and terminal-side loopback units are unnecessary, terminal or line interface boards can be provided in the locations where the loopback units are provided in the conventional system. Therefore, more terminal or line ports can be provided than in the conventional packet switching system.

More specifically, since it is not necessary to provide special hardware for the extension communication, loopback and switching relay as in the packet switching system of FIG. 1, a total of two line and terminal interface cards can be additionally provided in the same size of back plane as in the conventional system.

Although the number of lines provided on the back plane of the packet switching system of FIG. 7 is greater by 4 address control lines than the number of lines provided on the back plane of the packet switching system of FIG. 1, it is smaller than the number of lines in the conventional system.

When the same clock is used, the switching speed of packet according to the present invention is reduced by half compared with that of the conventional packet switching system. However, high-speed clock is relatively easy to provide under the current technological level. By increasing the speed of the clock, the packet switching speed of the present system becomes readily equal to or higher than that of the conventional packet switching system.

As has been described in the foregoing, in accordance with the present invention, since the single bus connected to the time divisional bus switch of the terminal and line interfaces is used in both directions, i.e., on a duplex transmission basis, the number of lines provided on the back plane of the packet switching system can be reduced to below half of that of the conventional system.

Further, since terminal and line interfaces are connected to the single duplex bus without and discrimination therebetween, it is unnecessary to provide a special hardware for the extension communication, switching relay and loopback. Therefore, the size of the packet switching system can be made small and the effective use of the back plane can be realized.

In addition, since the cell switch part of the packet switching system connected to the duplex type single bus is arranged without any discrimination between the terminal and line interfaces, the hardware of the cell switch part can be commonly used.

What is claimed is:
1. A packet switching system comprising:
   a single bus through which switching packet data including address data is transmitted;
   a clock bus through which clocks are transmitted;
   a plurality of transmitting/receiving interfaces, each connected to the single bus and the clock bus at a respective single point; and
   clock supply means for supplying, through the clock bus, the plurality of transmitting/receiving interfaces with clocks indicating a series of data transmitting time slots respectively associated with the plurality of transmitting/receiving interfaces.
   wherein each of the plurality of transmitting/receiving interfaces generates switching packet data from data supplied from one of a terminal and office lines, identifies the associated time slot among the series of the data transmitting time slots based on the clocks supplied through the clock bus, and transmits the generated switching packet data using the identified time slot, wherein each of the plurality of transmitting/receiving interfaces receives all of the switching packet data in the series of data transmitting time slots, extracts switching packet data addressed to the transmitting/receiving interface and transmits the extracted switching packet data to one of another terminal and an office line, wherein the clock supplying means supplies the clocks to the transmitting/receiving interfaces through the clock bus, the clocks including a first clock for indicating a start timing of a first time slot among the time slots constituting the series of the data transmitting time slots, a second clock for indicating a start timing of respective time slots constituting the series of the data transmitting time slots, a third clock for indicating a transmitting timing at which the transmitting/receiving interfaces transmit switching packet data, and a fourth clock for indicating a timing at which the transmitting/receiving interfaces receive the switching packet data from the single bus in all of the time slots, and wherein each of the transmitting/receiving interfaces transmits switching packet data to the single bus and receives switching packet data from the single bus based on the first through fourth clocks and an address of the transmitting/receiving interface.

2. A packet switching system as set forth in claim 1, wherein the plurality of transmitting/receiving interfaces are classified into a plurality of terminal interfaces and a plurality of line interfaces which are operated in a loop back switching connection and a switching relay connection.

3. A packet switching system comprising:
a single bus through which switching packet data including address data is transmitted;
a clock bus through which clocks are transmitted;
plurality of transmitting/receiving interfaces, each connected to the single bus and the clock bus at a respective single point; and clock supply means for supplying, through the clock bus, the plurality of transmitting/receiving interfaces with clocks indicating a series of data transmitting time slots respectively associated with the plurality of transmitting/receiving interfaces, said clocks including at least a first clock for indicating a start timing of a first time slot among the series of the data transmitting time slots, a second clock for indicating a start timing of respective time slots constituting the series of the data transmitting time slots and a third clock for indicating a transmitting timing at which the transmitting/receiving interfaces transmit switching packet data, wherein each of the plurality of transmitting/receiving interfaces generates switching packet data from data supplied from one of a terminal and office lines, identifies the associated time slot among the series of the data transmitting time slots based on the clocks supplied through the clock bus, and transmits the generated switching packet data using the identified time slot, wherein each of the plurality of transmitting/receiving interfaces receives all of the switching packet data in the series of data transmitting time slots, extracts switching packet data addressed to the transmitting/receiving interface and transmits the extracted switching packet data to one of another terminal and an office line, and wherein each of the transmitting/receiving interfaces has a predetermined number and includes means for generating a number for each of the series of data transmitting time slots based on a relative position of the second clock with respect to the first clock, means for comparing the number generated by the generating means with the predetermined number, and means for transmitting the switching packet data to the single bus in the time slot having the generated number using the third clock when the generated number compares with the predetermined number.

* * * * *

UNITED STATES PATENT AND TRADEMARK OFFICE
CERTIFICATE OF CORRECTION

PATENT NO. : 5,432,782
DATED : July 11, 1995
INVENTOR(S) : Muneyuki SUZUKI

It is certified that error appears in the above-indentified patent and that said Letters Patent is hereby corrected as shown below:

Claim 1, Column 10, Line 66, change "." to --,--.

Claim 3, Column 12, Line 1, before "plurality" insert --a--.

Signed and Sealed this

Sixth Day of May, 1997

*Attest:*

*Attesting Officer*

BRUCE LEHMAN

*Commissioner of Patents and Trademarks*